(12) United States Patent
Haro et al.

(10) Patent No.: US 10,036,201 B1
(45) Date of Patent: Jul. 31, 2018

(54) ACCESS LADDER ASSEMBLY FOR A MOVABLE MACHINE

(71) Applicant: Caterpillar Paving Products Inc., Brooklyn Park, MN (US)

(72) Inventors: Jason A. Haro, Dayton, MN (US); Nathan L. Mashek, St. Michael, MN (US); Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/813,826

(22) Filed: Nov. 15, 2017

(51) Int. Cl.
*B60R 3/02* (2006.01)
*E06C 5/22* (2006.01)
*E02F 9/08* (2006.01)
*E06C 7/18* (2006.01)
*E06C 7/08* (2006.01)

(52) U.S. Cl.
CPC ............... *E06C 5/22* (2013.01); *B60R 3/02* (2013.01); *E02F 9/0833* (2013.01); *E06C 7/081* (2013.01); *E06C 7/183* (2013.01)

(58) Field of Classification Search
CPC ..... B60R 3/00; B60R 3/02; E06C 5/00; E06C 5/22
See application file for complete search history.

(56) References Cited

U.S. PATENT DOCUMENTS

| | | | | |
|---|---|---|---|---|
| 5,064,022 A | * | 11/1991 | Graham | B60R 3/02 182/127 |
| 5,086,876 A | * | 2/1992 | Severson | E06C 7/423 182/107 |
| 5,727,648 A | * | 3/1998 | Jenkins, Jr. | E06C 1/125 182/187 |
| 8,113,315 B2 | | 2/2012 | Farley et al. | |
| 8,186,763 B2 | * | 5/2012 | Kramer | B60R 3/02 182/127 |
| 8,827,038 B2 | | 9/2014 | Salzman | |
| 8,919,497 B2 | * | 12/2014 | Rund | B60R 3/02 182/127 |

(Continued)

OTHER PUBLICATIONS

Bomag Fayat Group, "Bomag Cold Planers BM 1000/35, BM 1200/35, BM 1300/35," date unknown, 24 pp.
Photographs of Wirtgen Cold Planer, date and source unknown, 1 p.

*Primary Examiner* — John D Walters
*Assistant Examiner* — James J Triggs
(74) *Attorney, Agent, or Firm* — Leydig, Voit & Mayer, Ltd.

(57) ABSTRACT

An access ladder assembly for a machine includes a fixed section, a movable section, a biasing member, a locking member, and a release assembly. The fixed section includes a pair of guide members and a fixed step. The movable section is mounted on and is movable along the fixed section between extended and retracted positions. The movable section includes a pair of sidewalls, and at least one horizontal step and is biased towards the retracted position by the biasing member. The locking member locks the movable member at the extended position. The release assembly operates to release the locking member. A manually engagable actuator of the release assembly may be disposed adjacent the fixed step. The movable section may include rails that slide within a hollow portions of the guide members as the movable section moves between the extended and retracted positions.

20 Claims, 10 Drawing Sheets

(56) References Cited

U.S. PATENT DOCUMENTS

| | | | |
|---|---|---|---|
| 9,382,758 B2 * | 7/2016 | Kennedy | E06O 5/04 |
| 2001/0030081 A1 * | 10/2001 | Morimoto | B60R 3/02 182/85 |
| 2013/0048400 A1 * | 2/2013 | Holdener | B60R 3/02 180/89.1 |
| 2017/0167197 A1 * | 6/2017 | Johnson | E06O 5/04 |

* cited by examiner

US 10,036,201 B1

ACCESS LADDER ASSEMBLY FOR A MOVABLE MACHINE

TECHNICAL FIELD

This disclosure relates generally to ladder assembly and, more particularly, to a retractable ladder system for assisting in the ingress to and egress from a movable machine.

BACKGROUND

Machines such as cold planers or rotary mixers, may be used to remove an upper layer of material from a ground surface such as a roadway. Such machines may be configured with a rotary milling drum that engages the ground surface during a material cutting or milling operation. In order to adjust the cutting or milling depth, the machines may include hydraulic cylinders that adjust the elevation or height of the machine, including the milling drum, relative to the ground surface.

The machines also typically include an operator station together with a ladder to facilitate the ingress and egress from the operator station. In some instances, the minimum distance from the ground surface to the first or lower step of the ladder may be set or specified by governmental regulations. In other instances, the minimum distance from the ground surface to the first or lower step of the ladder may be set or specified by customer requirements. If the lower step or another component of the ladder is too close to the ground, the ladder or an object on the ground may be damaged if the machine is lowered to begin a material removing operation without raising the ladder or a lower portion thereof.

U.S. Patent Publication No. 2001/003008 discloses a ladder unit for climbing up and down a construction machine. The ladder unit includes a guide mounted on a body frame and the ladder is longitudinally slidable on the guide between a storage position and a decent position. A locking mechanism prevents the decent of the ladder and can be activated from a location on a catwalk. A balance weight is provided to return the ladder to the storage position.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, an access ladder assembly for a machine includes a fixed section, a movable section, a biasing member, a locking member, and a release assembly. The fixed section includes a pair of spaced apart, parallel guide members and a horizontal fixed step. The movable section is mounted on the fixed section and is movable along the fixed section and includes a path between an extended position and a retracted position. The movable section includes an engagement surface, a pair of spaced apart sidewalls, and at least one horizontal step extending therebetween. The biasing member is configured to bias the movable section towards the retracted position. The locking member is movable between a locked position and an unlocked position, wherein at the locked position, the locking member extends into the path of the movable section and engages the engagement surface of the movable section to prevent movement of the movable section from the extended position to the retracted position, and at the unlocked position, the locking member is spaced from the path of the movable section. The release assembly is operatively associated with the locking member and includes a manually engagable actuator disposed adjacent the fixed step of the fixed section. The manually engagable actuator is movable between a first position and a second position, wherein at the second position, the locking member is moved to the unlocked position.

In another aspect, an access ladder assembly for a machine includes a fixed section, a movable section, a biasing member, a locking member, and a release assembly. The fixed section includes a pair of spaced apart parallel guide members with the guide members having a hollow portion and a horizontal fixed step. The movable section is mounted on the fixed section and is movable along the fixed section and includes a path between an extended position and a retracted position. The movable section includes a pair of spaced apart sidewalls and at least one step extends therebetween. The movable section further includes a pair of follower members, with each of the follower members configured to slidably move within the hollow portion of one of the guide members as the movable section moves between the extended position and the retracted position. The biasing member is configured to bias the movable section towards the retracted position. The locking member is movable between a locked position and an unlocked position, wherein at the locked position, the locking member is configured to prevent movement of the movable section from the extended position to the retracted position, and at the unlocked position, the movable section is movable from the retracted position to the extended position. The release assembly is operatively associated with the locking member and is movable between a locked position and a released position, wherein upon moving the release assembly to the released position, the locking member is moved to the unlocked position.

In still another aspect, a machine includes a frame, a prime mover mounted on the frame, a ground-engaging drive mechanism operatively connected to the prime mover, an operator station, an elevation control mechanism to adjust a height of the machine relative to a ground surface, and an access ladder assembly for providing access to the operator station. The access ladder assembly includes a fixed section, a movable section, a biasing member, a locking member, and a release assembly. The fixed section includes a pair of spaced apart, parallel guide members and a horizontal fixed step. The movable section is mounted on the fixed section and is movable along the fixed section and includes a path between an extended position and a retracted position. The movable section includes an engagement surface, a pair of spaced apart sidewalls, and at least one horizontal step extending therebetween. The biasing member is configured to bias the movable section towards the retracted position. The locking member is movable between a locked position and an unlocked position, wherein at the locked position, the locking member extends into the path of the movable section and engages the engagement surface of the movable section to prevent movement of the movable section from the extended position to the retracted position, and at the unlocked position, the locking member is spaced from the path of the movable section. The release assembly is operatively associated with the locking member and includes a manually engagable actuator disposed adjacent the fixed step of the fixed section. The manually engagable actuator is movable between a first position and a second position, wherein at the second position, the locking member is moved to the unlocked position.

DETAILED DESCRIPTION

Figure 1:
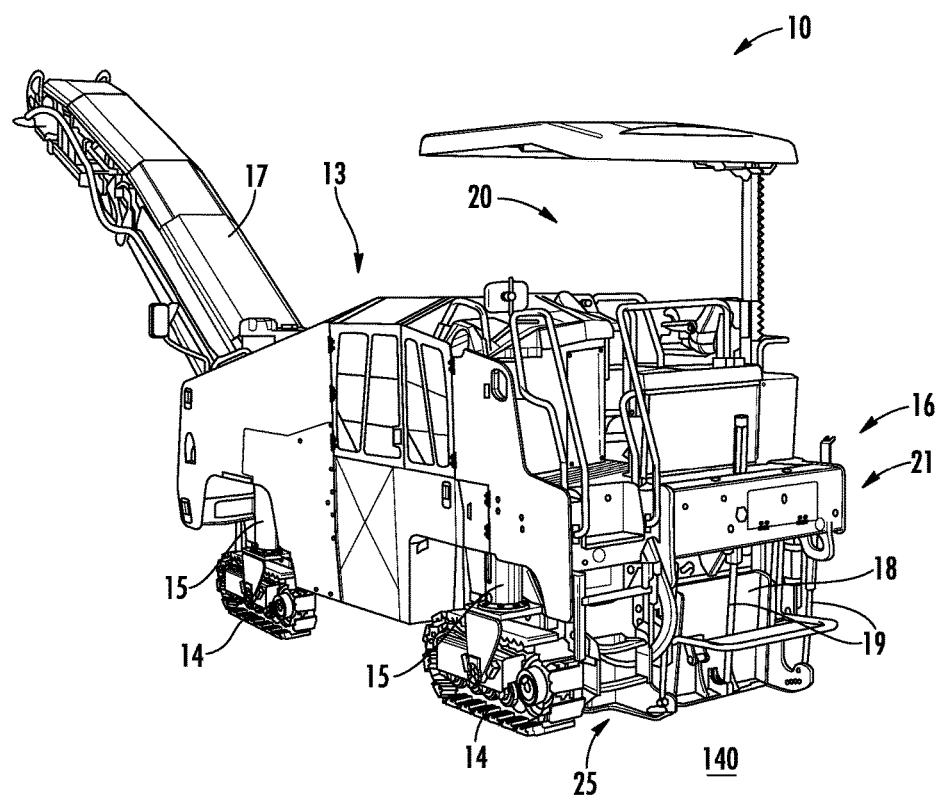
FIG. 1 illustrates a perspective view of a machine incorporating the access ladder assembly as disclosed herein.

A machine 10, such as a cold planer, is illustrated in FIG. 1 and includes a frame 12 (FIG. 2) and a prime mover 13 such as an engine. A plurality of ground-engaging drive mechanisms such as tracks 14 are configured to engage a ground surface 140 below the machine 10 and may be driven by the prime mover 13 to propel the machine 10 along the ground surface. The machine 10 may include a plurality of elevation control mechanisms 15, such as hydraulic cylinders, to adjust the height of the machine relative to the ground surface 140. Although machine 10 is shown in a "track-type" configuration, other configurations, such as a wheeled configuration, may be used.

Machine 10 may include a milling system, generally indicated at 16, configured to cut or grind a top layer of the ground surface 140. The milling system 16, may include a milling drum or roller (not shown) and a conveyor system 17. The milling drum may be rotatably supported on the frame 12 and is configured for power rotation relative thereto during operation. The milling drum may have a generally cylindrical shape and includes a plurality of cutting elements or bits (not shown) that are disposed along an outer surface of the milling drum and are configured to contact the ground surface 140 to perform a milling operation. The cutting depth of a milling operation may be adjusted by controlling the movement of the elevation control mechanisms 15.

The milling drum (not shown) may be enclosed within a shield or shroud structure 18. The position of the shroud structure 18 relative to the ground surface 140 may be movable or adjustable through the use of control members 19 such as hydraulic cylinders. The conveyor system 17 may be operatively associated with the milling drum to transport or convey cut or milled material removed from the ground surface 140 to a suitable machine such as a haul truck (not shown) spaced from the machine 10.

Machine 10 may include an operator station 20 that an operator may physically occupy and provide input to control the machine. Operator station 20 may include one or more input devices (not shown) through which the operator may issue commands to control the propulsion system and steering system of the machine as well as operate various implements associated with the machine 10 such as the milling system 16.

Figure 2:
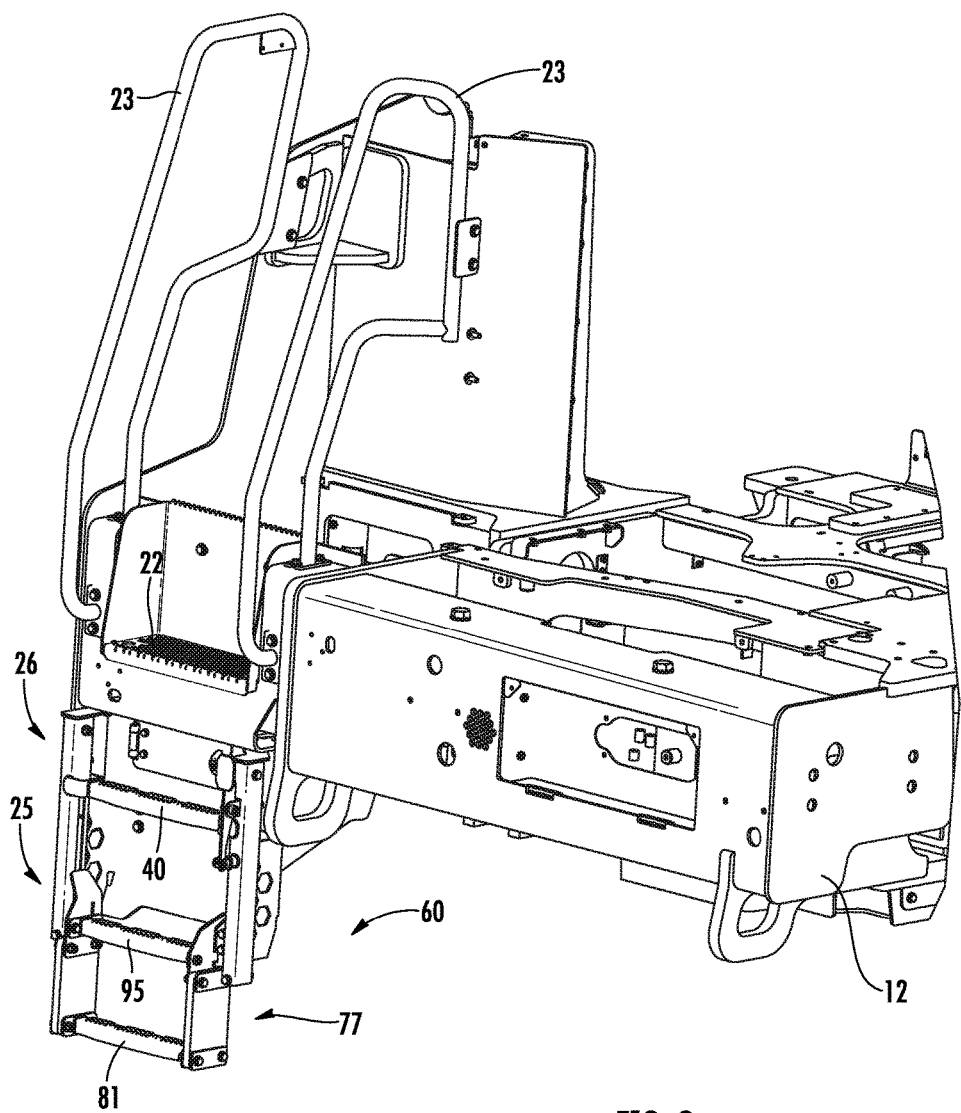
FIG. 2 illustrates an enlarged, fragmented perspective view of an access ladder assembly mounted on a frame of the machine of FIG. 1 taken from a different perspective.
Figure 3:
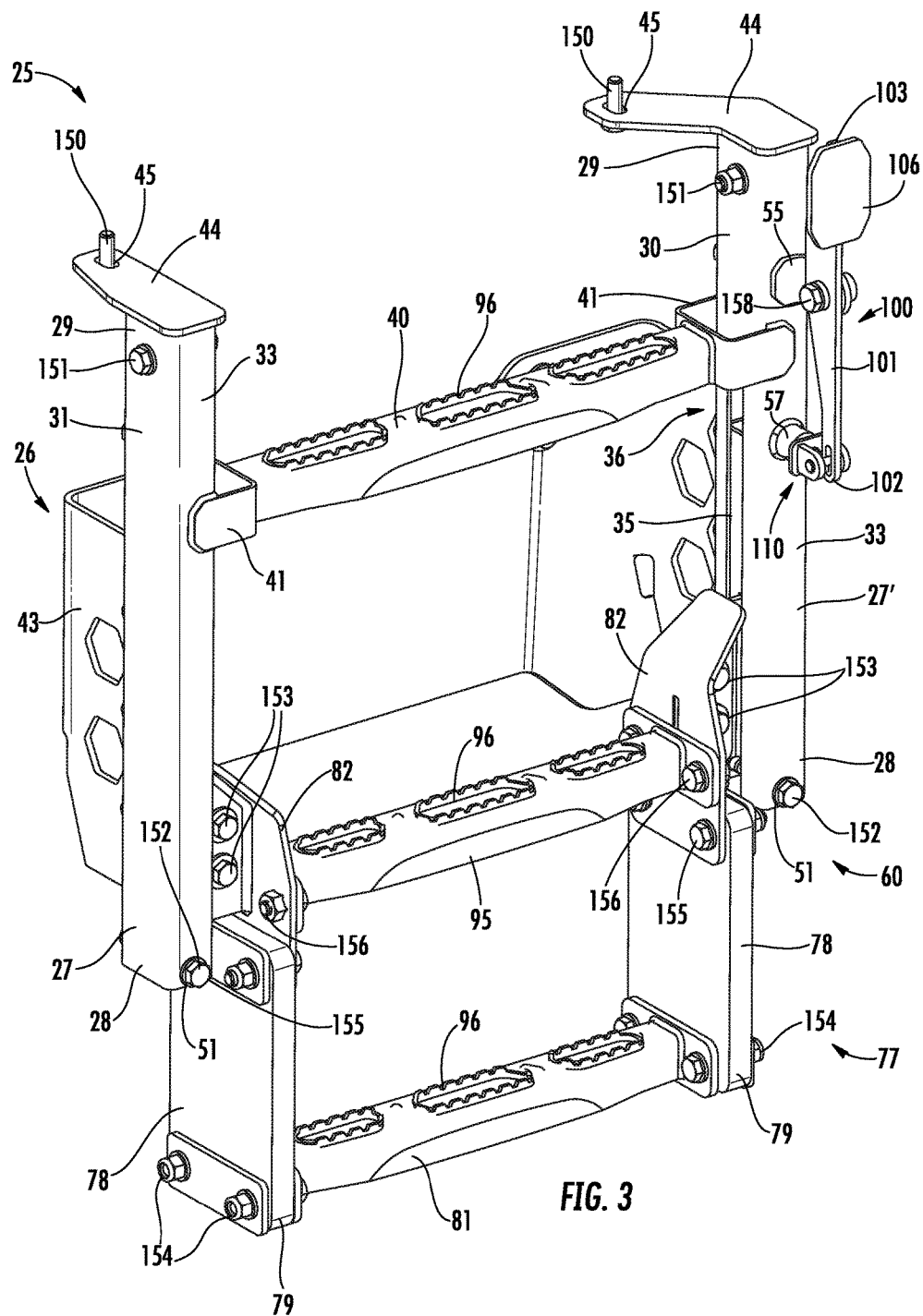
FIG. 3 illustrates a perspective view of the access ladder assembly of FIG. 2 taken from the perspective of FIG. 1 with the assembly in its extended position.
Figure 4:
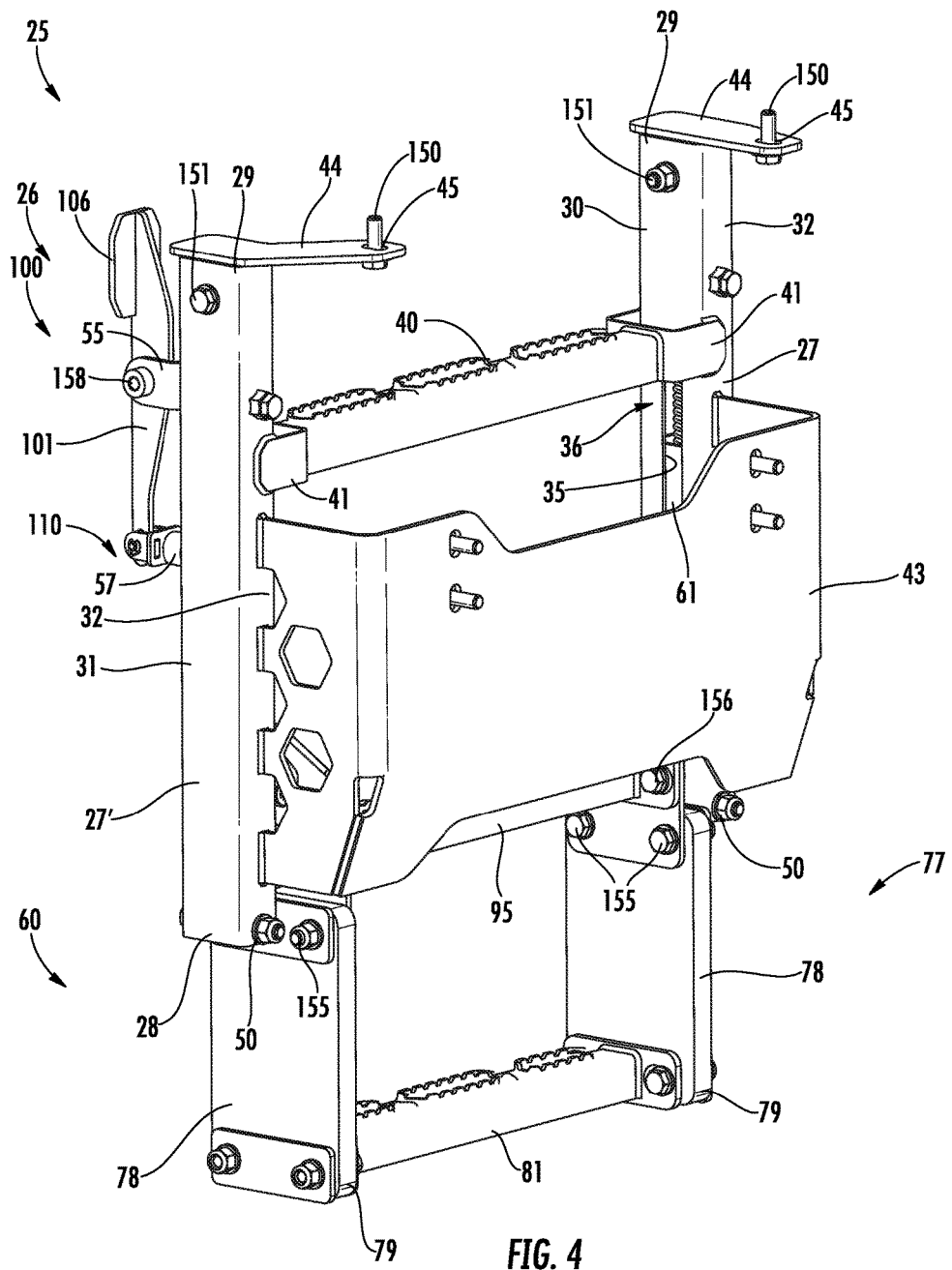
FIG. 4 illustrates a perspective view of the access ladder assembly of FIG. 3 but from an opposite orientation.
Figure 5:
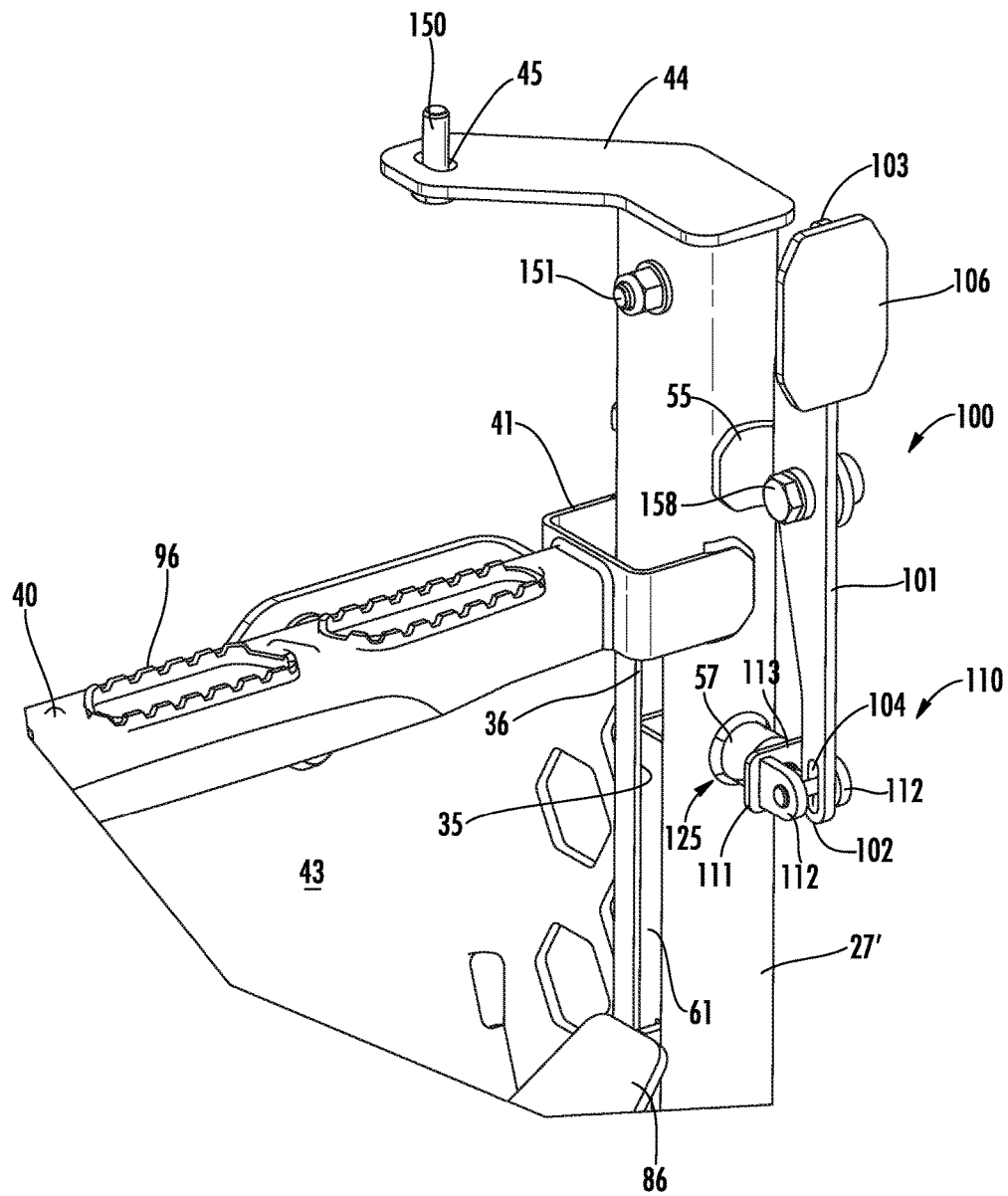
FIG. 5 illustrates an enlarged, fragmented perspective view of a portion of the access ladder assembly of FIG. 3.

In order to facilitate access to the operator station 20, an access ladder assembly 25 may be provided adjacent the operator station. In the depicted embodiment, the access ladder assembly 25 is located adjacent a rear end 21 of the machine 10 and is mounted to a portion of the frame 12 (FIG. 2). As depicted, the access ladder assembly 25 may be aligned with one or more additional steps 22 and the machine 10 may further include hand rails 23 to facilitate the ingress and egress from the operator station 20.

Referring to FIGS. 3-7, the access ladder assembly 25 is illustrated in greater detail in a deployed or extended position at which an operator may readily step from the ground surface 140 onto the ladder assembly or from the ladder assembly onto the ground surface. Access ladder assembly 25 may include an upper or fixed section 26, a lower or movable section 60, a release assembly 100, and one or more biasing members 130.

The fixed section 26 may include a pair of spaced apart, vertical guide members 27 that are generally parallel. The guide members 27 may be elongated hollow or tube-like members having a lower end 28 and an upper end 29. The guide members 27 may have a generally rectangular cross-section and an outer surface defined by an inward facing surface 30, an outward facing surface 31, a forward facing surface 32, and a rearward facing surface 33. As used herein, the phrase "inward facing" and the word "inwardly" refer to facing towards an a vertical axis extending through the center of the access ladder assembly 25, the phrase the phrase "outward facing" refers to facing away from the vertical axis extending through the center of the access ladder assembly, the phrase "forward facing" refers to facing towards the front of the machine 10, and the phrase "rearward facing" refers to facing towards the rear of the machine. In addition, each guide member 27 may include an elongated slot 35 extending from the lower end 28 of the guide member partway towards the upper end 29 of the guide member along the inward facing surface 30 of the guide member. In the depicted embodiment, the elongated slots 35 extend to a location, generally depicted at 36, spaced from the upper end 29 of the guide members 27 about one third of the length of the guide members.

A horizontal fixed step 40 may extend between the guide members 27 generally adjacent the upper end 36 of the elongated slots 35. As depicted, each end 41 of the horizontal fixed step 40 may be U-shaped and dimensioned to receive a portion of one of the guide members 27 between the legs of the U-shape. The horizontal fixed step 40 may be secured to the guide members 27 in any desired manner. In one embodiment, the guide members 27 and the horizontal fixed step 40 may be welded together.

A U-shaped foot well 43 may also extend between the guide members 27. The foot well 43 may be secured to the guide members 27 along the forward facing surface 32 of the guide members. The foot well 43 may be secured to the guide members 27 and any desired manner. In one embodiment, the guide members 27 and the foot well 43 may be welded together.

A mounting flange 44 may be secured to the upper and 29 of each guide member 27 to facilitate securing the access ladder assembly 25 to the frame 12 of the machine 10. As depicted, the mounting flange is 44 are planar and include an aperture 45 through which a fastener 150, such as a bolt, may extend to secure the access ladder assembly 25 to the frame 12.

Each guide member 27 may include a first or outward facing biasing member or spring mounting hole or bore 47 (FIG. 7) adjacent the lower end 28 and that extends through the outward facing surface 31 of the guide member and a second or inward facing biasing member or spring mounting hole or bore 48 that extends through the inward facing surface 30 and is aligned with the outward facing bore. As described in more detail below, each pair of bores defined by an outward facing spring mounting bore 47 and an inward facing spring mounting bore 48 may be configured to receive a fastener 151, such as a bolt, that supports the upper end 132 of biasing member 130.

Each guide member 27 may further include a first or forward facing travel limiting hole or bore 50 adjacent the upper end 29 and that extends through the forward facing surface 32 of the guide member and a second or rearward facing travel limiting hole or bore 51 that extends through the rearward facing surface 33 and is aligned with the forward facing hole. As described in more detail below, each pair of bores defined by a forward facing travel limiting bore 50 and rearward facing travel limiting bore 51 may be configured to receive a fastener 152, such as a bolt, that functions as a travel limiting stop member.

One of the guide members 27 may include mounting components for facilitating the mounting and operation of the release assembly 100 and locking assembly 120 as described in further detail below. The guide member having the mounting components may be identified herein as 27' to distinguish it from the other guide member when referring to an aspect of the guide member that is unique to the inclusion of the additional components. More specifically, guide member 27' may include an L-shaped bracket 55 having a horizontal bore 56 extending through the cantilevered leg of the bracket. In embodiments, the L-shaped bracket 55 may be positioned adjacent the location at which the horizontal fixed step 40 is secured to the guide member 27'. In one embodiment, the L-shaped bracket 55 may be positioned slightly above the location at which the horizontal fixed step 40 is secured to the guide member 27'. The bracket 55 may be secured to the guide member 27' in any desired manner. In one embodiment, the bracket 55 may be welded to the guide member 27'. A cylindrical lock mounting member 57 may be mounted on and extend into the guide member 27' at a location spaced from and vertically aligned with the bracket 55. The inner surface 58 of the cylindrical lock mounting member 57 may have threads along a portion thereof. The cylindrical lock mounting member 57 may be secured to the guide member 27' in any desired manner. In one embodiment, the tubular guide member may be welded to the guide member 27'.

The movable section 60 may include a pair of generally parallel, spaced apart, vertical members or rails 61 and a step section 77. The rails 61 may be elongated hollow or tubelike members with a lower end 62 and an upper end 63. The rails 61 may have a generally rectangular cross-section configured to be slidably received within a hollow portion of the guide members 27 of the fixed section 26. In an embodiment, the guide members 27 and rails 61 may be dimensioned so that the configuration of the rails generally matches the configuration of the guide members and permits the rails to act as follower members that are guided by and slide within the guide members. As depicted, the rails 61 have a generally rectangular cross-section and an outer surface defined by an inward facing surface 65, an outward facing surface 66, a forward facing surface 67, and a rearward facing surface 68, corresponding to the inward facing surface 30, the outward facing surface 31, the forward facing surface 32, and the rearward facing surface 33 of the aligned guide member 27.

A resilient bumper 69 may be disposed adjacent the lower end 62 of each rail 61. In an embodiment, the resilient bumper 69 may be formed of an elastomeric material.

Each rail 61 may include a first or outward facing biasing member or spring mounting aperture or slot 70 adjacent the upper end 63 and that extends through the outward facing surface 66 of the rail and a second or inward facing biasing member or spring mounting aperture or slot 71 that extends through the inward facing surface 65 and is aligned with the outward facing slot. As described in more detail below, each pair of slots defined by an outward facing spring mounting slot 70 and an inward facing spring mounting slot 71 may be configured to receive an element, such as a spring mounting projection 88, that engages the lower end 131 of biasing member 130.

A vertically elongated mounting bracket 75 may extend inwardly from the inward facing surface 65 of each rail 61. The mounting brackets 75 may include mounting holes or bores 76 to receive fasteners 153, such as bolts, to secure the rails 61 to the step section 77 as described in more detail below. Each mounting bracket 75 may have a thickness configured to permit the bracket to slide within and be guided by a slot 35 along the inward facing surface 30 of a guide member 27. The mounting bracket 75 may be secured to the rail 61 in any desired manner. In one embodiment, the mounting bracket 75 may be welded to the rail 61.

The step section 77 may include a pair of spaced apart vertical sidewalls 78 with each having a lower end 79 and an upper end 80 to define a generally rectangular structure. A horizontal lower step 81 extends between and is secured to the sidewalls 78 adjacent the lower end 79 of the vertical sidewalls 78. The horizontal lower step 81 may be secured to the sidewalls 78 in any desired manner. In one embodiment, the horizontal lower step 81 may be secured to the sidewalls 78 with fasteners 154 such as bolts.

A bracket 82 extends upward from each sidewall 78. Each bracket 82 includes an inwardly facing surface 83 and an outwardly facing surface 84. Each bracket 82 may include a lower vertical section 85 secured to the upper end 80 of each sidewall 78 and an outwardly angled upper section 86 that extends upward from the vertical section 85. A flange 87 may extend perpendicularly from the outwardly facing surface 84 of each bracket 82 and includes a pair of mounting holes or bores (not shown) through which fasteners 153, such as bolts, may extend to secure the step section 77 to the rails 61 during assembly. The flange 87 may further include a biasing member or spring mounting projection 88 that extends in a cantilevered manner outward or away from the outwardly facing surface 84. The lower surface 90 of the spring mounting projection 88 may include an angled notch 91 in which the loop 133 at the lower end 131 of biasing member 130 may be disposed.

The brackets 82 may be secured to the sidewalls 78 in any desired manner. In one embodiment, the brackets 82 may be secured to the sidewalls 78 with fasteners 155 such as bolts. Flanges 87 may be secured to the brackets 82 in any desired manner. In one embodiment, the flanges 87 may be welded to the brackets 82.

An horizontal upper step 95 extends between and is secured to the inwardly facing surfaces 83 of the brackets 82 along the vertical section 85 of each bracket. The horizontal upper step 95 may be secured to the brackets 82 in any desired manner. In one embodiment, the horizontal upper step 95 may be secured to the brackets 82 with fasteners 156 such as bolts.

Figure 8:
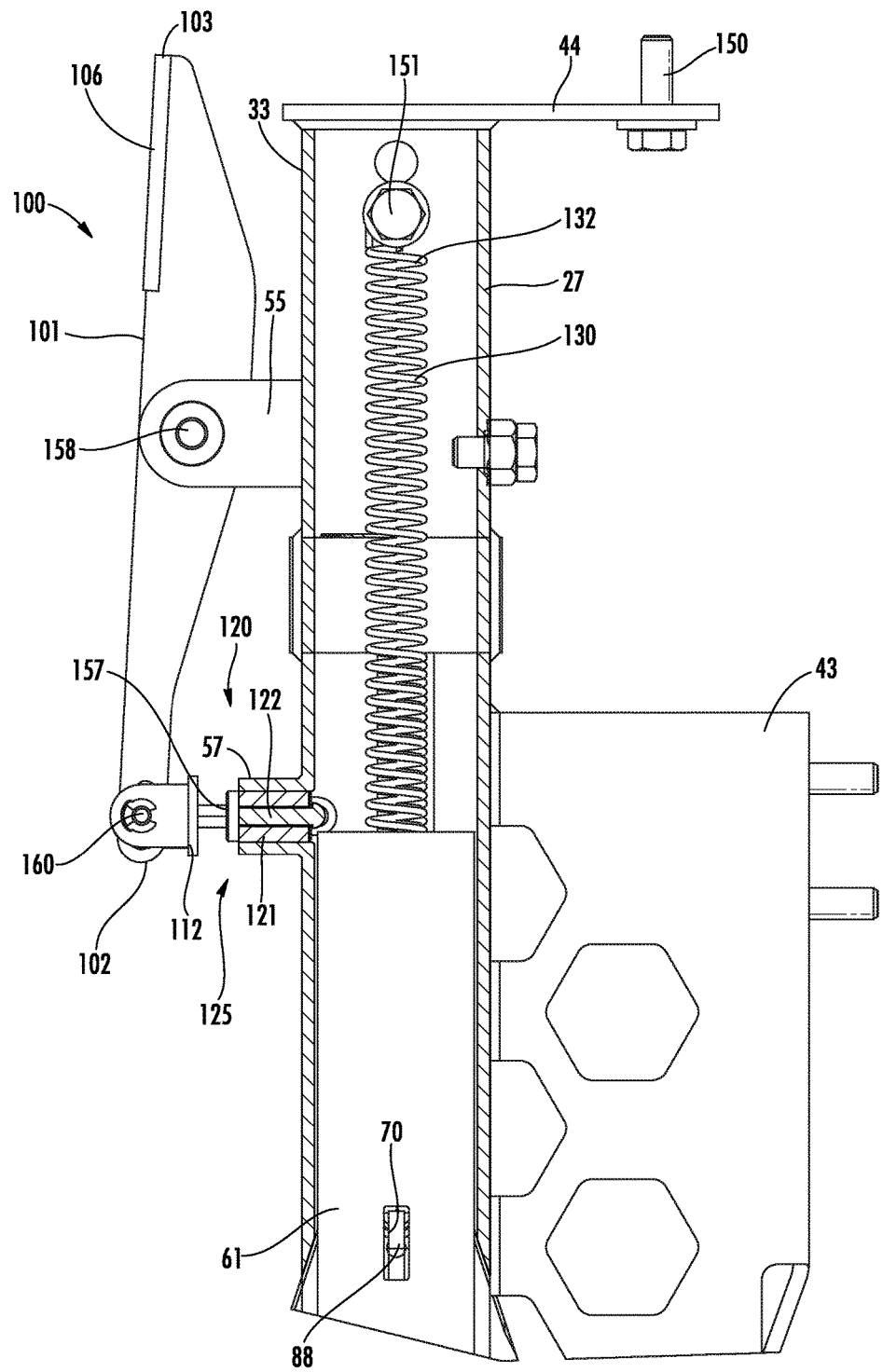
FIG. 8 illustrates an enlarged, fragmented side view similar to FIG. 6 but with the release assembly in a released position and the locking assembly in an unlocked position but with the movable section in its extended position.
Figure 9:
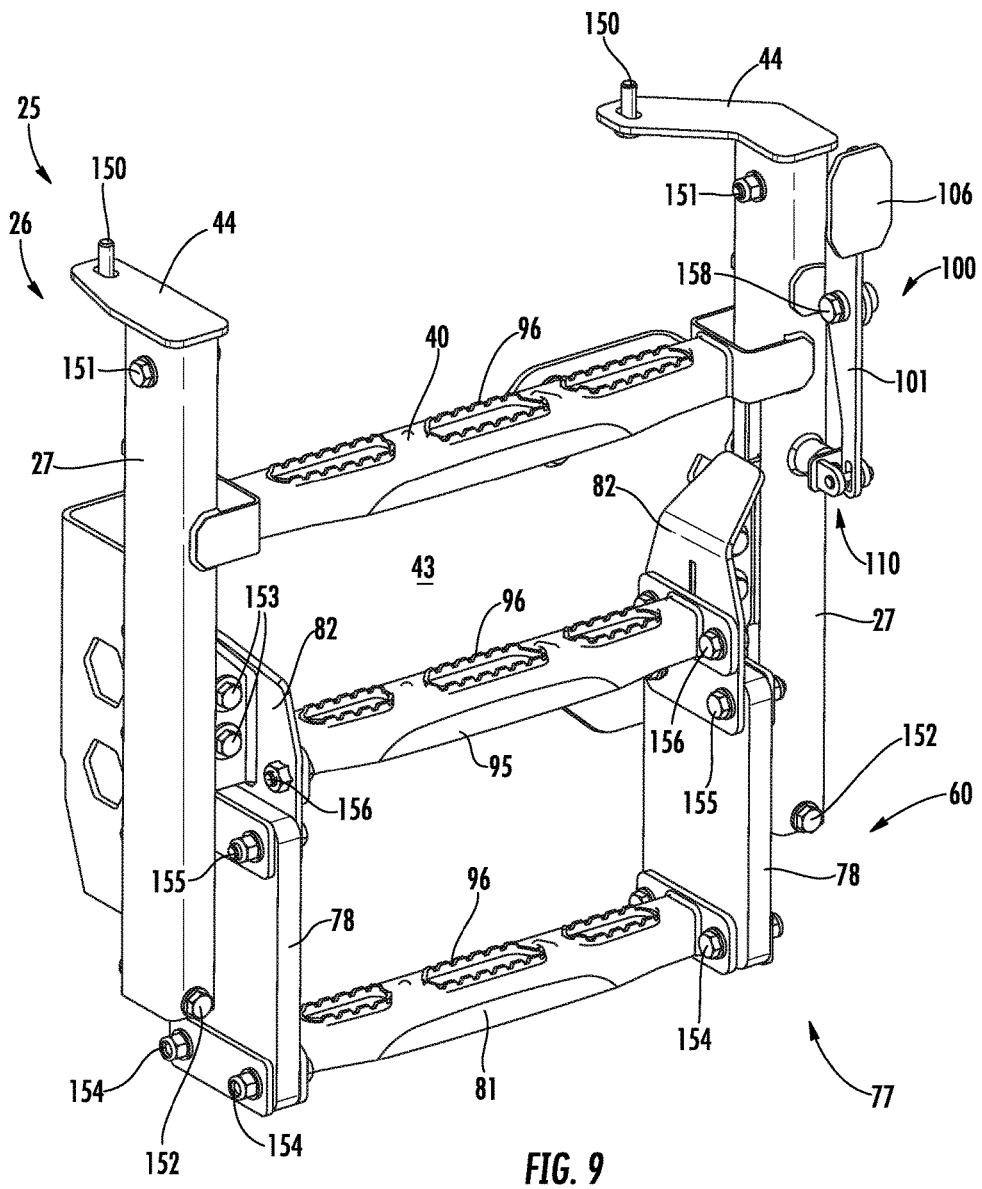
FIG. 9 illustrates a perspective view of the access ladder assembly similar to FIG. 3 but with the assembly in its retracted position.
Figure 10:
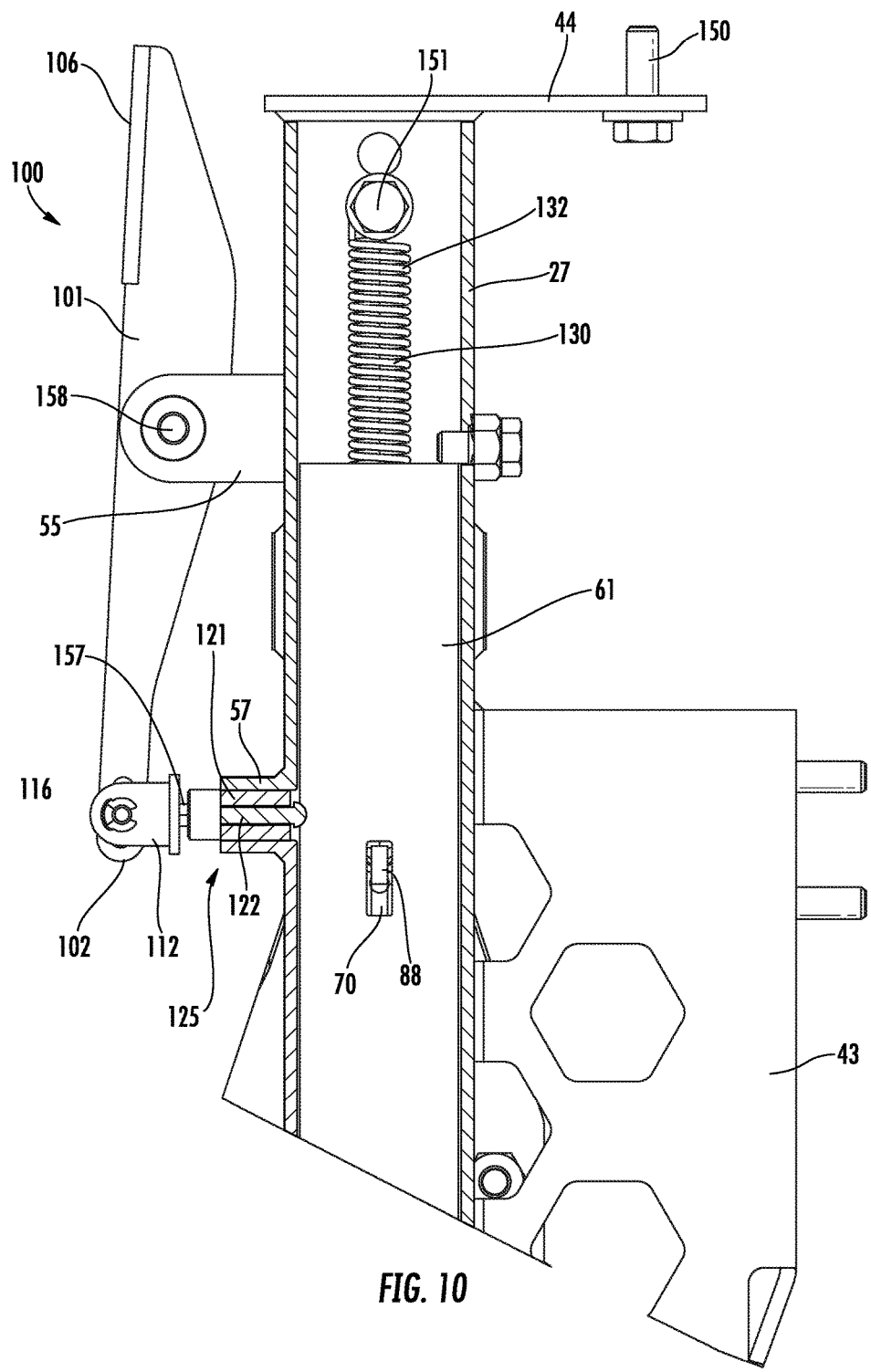
FIG. 10 illustrates an enlarged, fragmented side view similar to FIG. 8 with the release assembly in a released position and the locking assembly in an unlocked position but with the movable section in its retracted position.

Release assembly 100 may include a release lever 101 and a clevis assembly 110. The release lever 101 may be generally elongated and includes a lower end 102 and an upper end 103. A vertical slot 104 extends along the release lever 101 adjacent the lower end 102 and is oriented generally along the axis of the lever. A hole or bore 105 may be disposed generally centrally between the lower end 102 and the upper end 103 and functions as the mounting and pivot point for the release lever 101 upon mounting the release lever on the guide member 27' and permits movement of the release lever between a first or locked position (FIGS. 5-6) and second or released position (FIGS. 8, 10).

A manually engagable actuator such as a pedal 106 may be disposed or located adjacent the upper end 103 of the release lever 101. As depicted, the pedal 106 is generally planar and configured to be actuated or depressed by engagement with a foot of an operator. In embodiments, the release lever 101 may be configured so that the pedal 106 is disposed adjacent the horizontal fixed step 40 to permit an operator to press the pedal when standing on the horizontal fixed step. As depicted, the pedal 106 is positioned above or slightly above the horizontal fixed step 40.

The clevis assembly 110 may include a clevis 111 having a pair of spaced apart legs 112 interconnected by a bight 113. Each leg 112 may include a hole or bore 114. When assembled, the lower end 102 of the release lever 101 is positioned within the space 115 between the legs 112 with the bores 114 aligned with the slot 104 in the lower end of the release lever. A clevis pin 116 may be inserted through the slot 104 and bores 114 and secured to the clevis 111.

Figure 6:
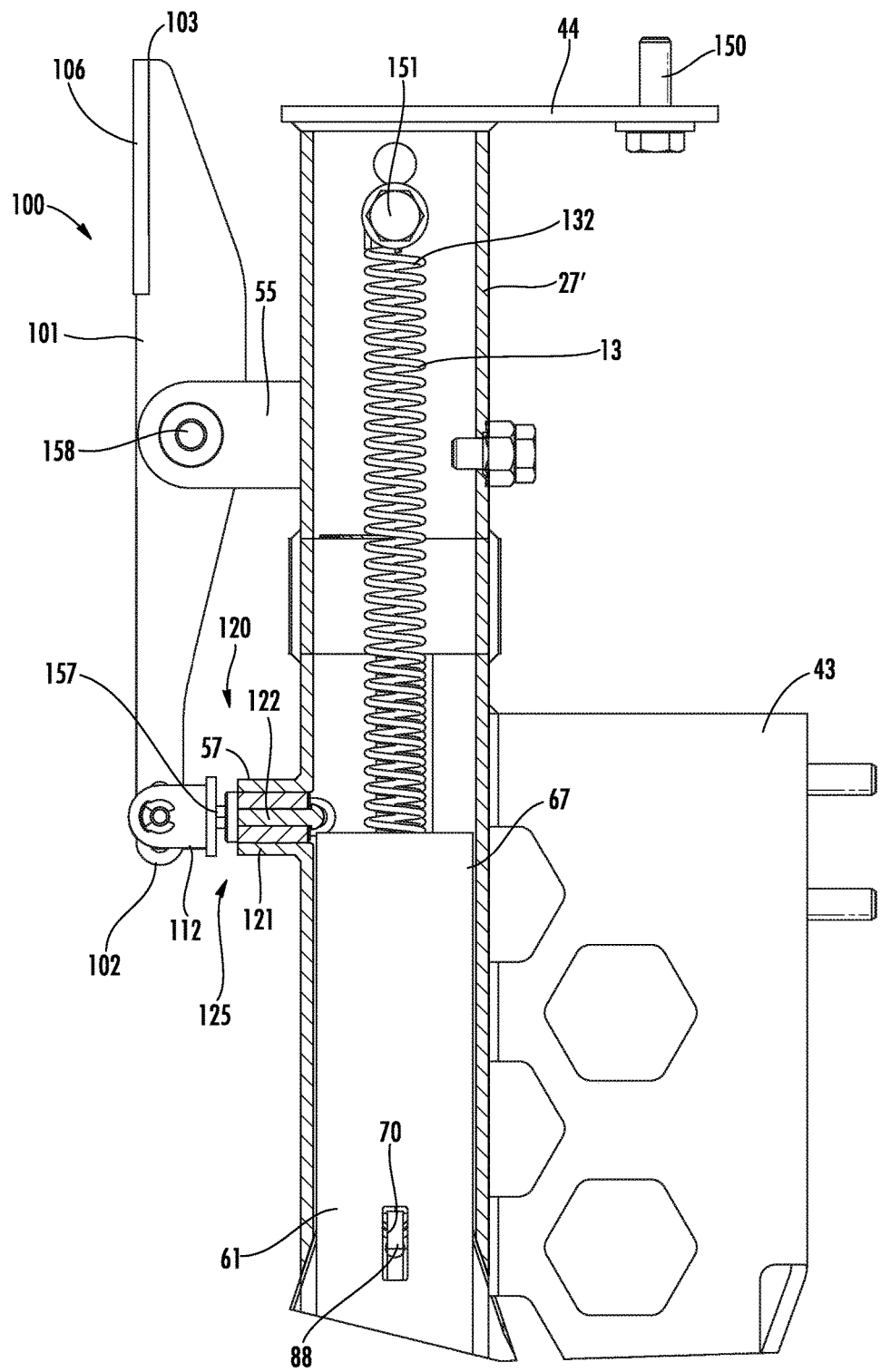
FIG. 6 illustrates an enlarged, fragmented side view of a portion of the access ladder assembly of FIG. 4 with portions of the guide member and locking assembly in section for clarity.

A locking assembly 120 may be mounted within the cylindrical lock mounting member 57 and is configured to lock the movable section 60 in the downward or extended position. The locking assembly 120 may be generally cylindrical and have an outer housing 121 and a locking member 122 within and movable relative to the outer housing. The outer surface 123 of the outer housing 121 may include threads configured to be threadingly received within the threaded inner surface 58 of the cylindrical lock mounting member 57 to secure the locking assembly therein 120. As a result, the locking member 122 may slide relative to the outer housing 121 and the cylindrical lock mounting member 57 between a locked position (FIGS. 5-6) and an unlocked position (FIGS. 8, 10). A lock biasing member indicated generally at 125, such as a spring, may be disposed between the outer housing 121 and the locking member 122 to bias the locking pin towards a locked position and into the guide member 27 as depicted in FIG. 6.

The locking member 122 may be secured to the bight 113 of the clevis 111 to facilitate movement of the locking member. In one embodiment, the locking member 122 may be secured to the bight 113 through a fastener 157 such as a bolt. Other manners of securing the locking member 122 to the clevis 111 are contemplated.

The release lever 101 may be mounted to the L-shaped bracket 55 on one of the guide members 27 of the fixed section 26 with a fastener 158, such as a bolt, that extends through both the bore 56 in the bracket and the bore 105 in the release lever. Through such a configuration, the release lever 101 is movable or pivotable between a first or locked position (FIGS. 5-6) and second or released position (FIGS. 8, 10). At the locked position, the locking member 122 extends through the guide member 27 at the rearward facing surface 33 into the path of the rail 61. The engagement between the clevis 111 and the locking member 122 together with the functionality of the lock biasing member 125 biases the release assembly 100 towards the locked position.

As depicted, the access ladder assembly 25 includes two biasing members 130 with one being associated with each pair of guide member 27 and rails 61. The biasing members 130 may be configured as extension springs with a lower end 131 and an upper end 132. Each biasing member 130 may include a hook or loop 133 at each end. As may be seen in FIGS. 6-7, each biasing member 130 may extend through an aligned hollow portion of a guide member 27 and an aligned portion of a rail 61 which defines a follower hollow portion and slides through the guide member. The biasing members 130 operate to bias or pull the movable section 60 towards the fixed section 26. Other forms and other numbers of biasing members or elements are contemplated. The biasing members 130 may be configured to provide a sufficient force to pull the movable section 60 upward upon unlocking the locking assembly 120 while permitting the movable section to move downward in a controller manner upon an operator stepping on the horizontal upper step 95 with the locking member 122 in an unlocked position.

Each of the components of the fixed section 26, the movable section 60, the release assembly 100, the locking assembly 120, and the biasing members 130 may be formed of any desired material. In one embodiment, each of the components may be made of steel. Each of the horizontal steps 40, 81, 95 may have any desired shape. As depicted, each of the horizontal steps 40, 81, 95 may be generally tubular with a generally flat upper surface and shoe engagement projections 96, if desired.

Figure 7:
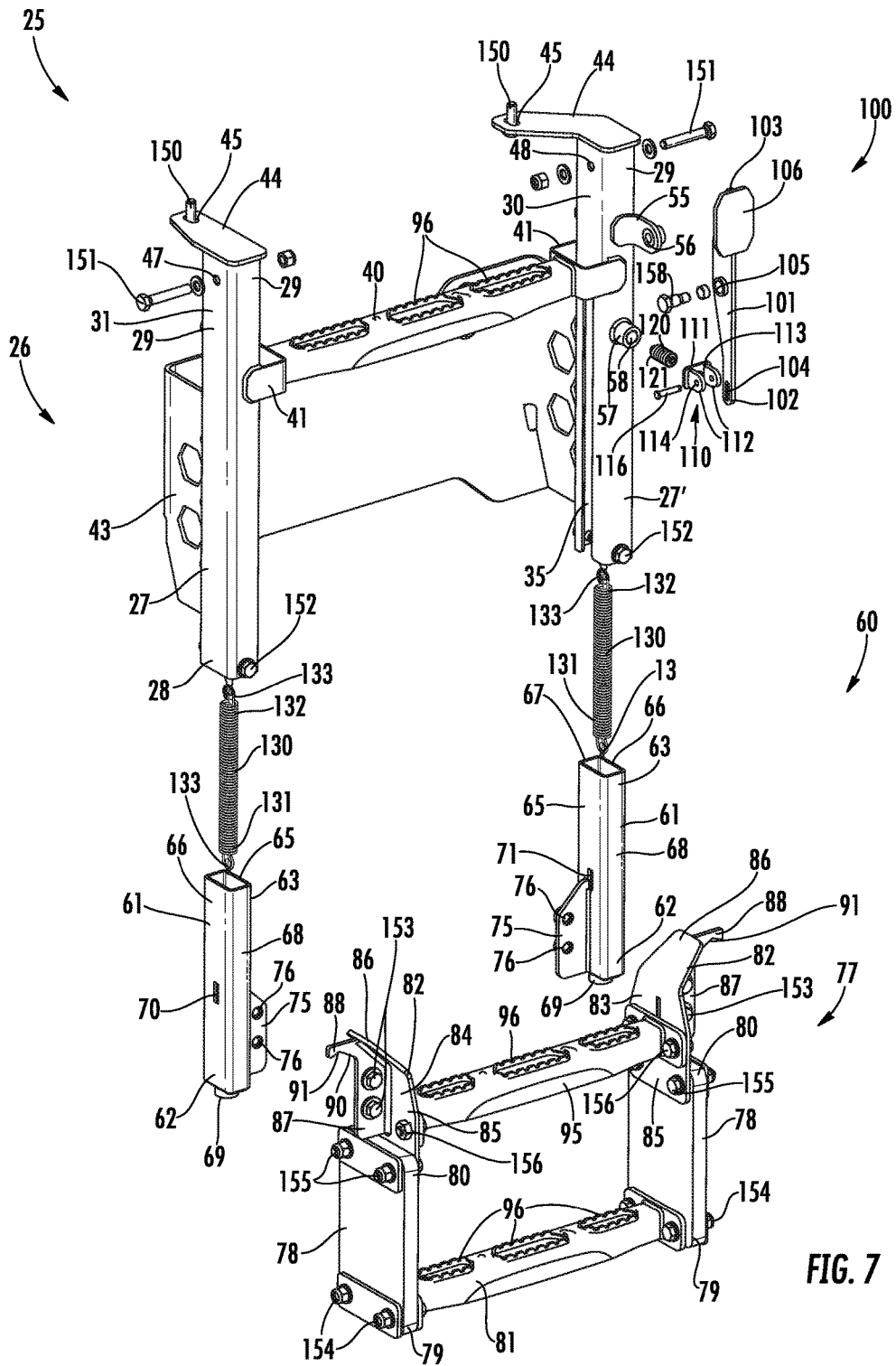
FIG. 7 illustrates an exploded perspective view of the access ladder assembly of FIG. 3.

To assemble the access ladder assembly 25, the fixed section 26 may be assembled in the form depicted in FIG. 7 but without the fasteners 152 that function as travel limiting stop members mounted in the forward facing travel limiting bores 50 and the rearward facing travel limiting bores 51. In addition, the fasteners 150 that extends through the apertures 45 in the mounting flanges 44 are also excluded from the assembly.

The step section 77 of the movable section 60 may also be assembled in the form depicted in FIG. 7 but without installing the fasteners 153 that are used to secure the step section to the rails 61.

The upper end 132 of a biasing member 130 may be inserted into each of the guide members 27 from the lower end 28. The loop 133 at the upper end 132 of the biasing member 130 may be aligned with the outward facing spring mounting bore 47 and the inward facing spring mounting bore 48 and a fastener 151 extended through the loop and the bores.

Tension may be applied to the loop 133 at the lower end 131 of each biasing member 130 to extend the biasing member so that the lower loop extends out of the lower end 28 of the guide member 27. The lower end 131 of a biasing member 130 may be inserted into each of the rails 61 through the upper end 63 until the loop 133 at the lower end 131 is aligned with the outward facing spring mounting slot 70 and the inward facing spring mounting slot 71 of one of the rails. The step section 77 may then be positioned so that the spring mounting projection 88 on each side thereof extends through the loop 133 at the lower end 131 of biasing member 130, the outward facing spring mounting slot 70, and the inward facing spring mounting slot 71. The step section 77 may be secured to the rails 61 with fasteners 153.

The rails 61 may be inserted into the lower end 28 of the guide members 27 with the mounting brackets aligned with and extending into the slots 35 of the guide members. A fastener 152 may be inserted into each pair of forward facing travel limiting bores 50 and rearward facing travel limiting bore 51 to secure the rails 61 within the guide members 27 and thus secure the movable section 60 to the fixed section 26.

Release assembly 100 and locking assembly 120 may be mounted on guide member 27' by threadingly inserting the locking assembly 120 into the cylindrical lock mounting member 57. The clevis 111 of the release assembly 100 may be secured to the locking member 122 with a fastener 157. The bore 105 of the release lever 101 may be aligned with the bore 56 in the L-shaped bracket 55 and a fastener 158 inserted through the two bores to secure the release lever to the guide member 27'. The release lever 101 may then be pivoted so that the slot 104 at the lower end 102 of the release lever is aligned with the bores 114 in the clevis 111. The clevis pin 116 may be inserted through the slot and the bores and the clevis pin secured to the clevis 111.

Other manners and sequences of assembling the access ladder assembly 25 are contemplated.

INDUSTRIAL APPLICABILITY

The industrial applicability of the access ladder assembly 25 described herein will be readily appreciated from the forgoing discussion. The foregoing discussion is applicable to machines that utilize an access ladder assembly at a work site. Such machines may be used at a roadwork site, a mining site, a landfill, a quarry, a construction site, a forest, a farm, or any other area in machines are used that include access ladder assemblies to assist in climbing onto and off of the machines.

In one embodiment, the access ladder assembly 25 may be used with a machine 10 such as a cold planer, a rotary mixer, or any other machine in which an upper layer of material is removed from a ground surface 140 such as a roadway. To perform a material cutting or milling operation with a cold planer, the frame 12 of the machine 10, and thus the components thereon, maybe lowered to set the cutting or milling depth. The access ladder assembly 25 described herein readily facilitates movement of the ladder assembly between a retracted position and an extended position, and between an extended position and a retracted position.

The access ladder assembly 25 is depicted in its extended position or configuration in FIGS. 3-6. At such position, the movable section 60 and the biasing members 130 are in their extended position with the rails 61 disposed at their lowermost position within the interior of the guide members 27. In an embodiment, the distance between the horizontal fixed step 40 and the horizontal upper step 95 may be approximately equal to the distance between the horizontal lower step 81 and the horizontal upper step.

The release assembly 100 is at its locked position with the locking member 122 of locking assembly 120 extending into the guide member 27 and blocking the path of the rail 61. The upward force exerted by the biasing members 130 forces the rails 61 upward so that the upper surface of the rail within guide member 27' operates as an engagement surface and engages the locking member 122 and prevents upward movement of the rails 61, and thus prevents upward movement of the movable section 60.

To move the access ladder assembly from the extended position to the retracted position, an operator may depress or engage the pedal 106 to move the pedal towards the rearward facing surface 33 of the guide member 27 as depicted in FIG. 8. Such movement of the pedal 106 towards the rearward facing surface 33 will cause the release lever 101 to rotate or pivot about fastener 158 and thus move the lower end 102 of the release lever away from the rearward facing surface of the guide member 27. The connection between the slot 104 in the release lever 101, the clevis assembly 110 and the locking member 122 will cause the locking member to retract into the outer housing 121 of the locking assembly 120 and thus remove the locking member from the path of the rail 61. The force provided by the biasing members 130 will then cause the movable section 60 to slide upward relative to the fixed section 26. The movable section 60 may move upward until reaching its retracted position as depicted in FIG. 10.

In the retracted position, the movable section 60 and biasing members 130 are at their retracted positions with the rails 61 disposed at their uppermost position within the interior of the guide members 27. In an embodiment, the distance between the horizontal fixed step 40 and the horizontal upper step 95 is less than the distance between the horizontal lower step 81 and the horizontal upper step.

The release assembly 100 is in its unlocked position with the locking member 122 of locking assembly 120 engaging and being biased against the rearward facing surface 68 of the adjacent rails 61. Since the rearward facing surface 68 is flat, the only significant force preventing movement of the movable section 60 downward relative to the fixed section 26 is that provided by the biasing members 130.

Accordingly, to move the access ladder assembly 25 from the retracted position to the extended position, an operator is merely required to step onto the horizontal upper step 95 and the weight of the operator will cause the movable section 60 to move downward relative to the fixed section 26. In doing so, the rails 61 will slide downward within the inside of the guide members 27 until the resilient bumpers 69 engage the fasteners 152 that function as a travel limiting stop member. As the rails 61 slide downward within the guide members 27, the locking member 122 will slide along the rearward facing surface 68 of one of the rails 61. As the movable section 60 approaches or reaches its lower end of travel position, the upper end 63 of the rail 61 will be below the locking member 122. The lock biasing member 125 of the locking assembly 120 will force the locking member out of the outer housing 121 and towards the forward facing surface 67 as best seen in FIG. 6. The locking member 122 will thus move from its unlocked position at which the end of the pin engages the rearward facing surface 68 of the rail to its locked position at which the end of the pin extends over or into the path of the rail 61 adjacent the rearward facing surface. Thus, the locking member 122 of the locking assembly 120 locks the movable section 60 in place and prevents its movement upward.

It will be appreciated that the foregoing description provides examples of the disclosed system and technique. However, it is contemplated that other implementations of the disclosure may differ in detail from the foregoing examples. For example, although the access ladder assembly 25 is depicted with a horizontal fixed step 40 extending between and mounted to a pair of spaced apart guide members 27, the horizontal fixed step may not extend between and/or be mounted to the guide members.

In another example, the release assembly 100 may be configured with the pedal 106 positioned at a different location. For example, the release lever 101 could be longer so that the pedal 106 is adjacent the additional step 22, between the additional step and the horizontal fixed step 40, or at another location. Further, the release lever 101 may be longer and include an actuator positioned adjacent a hand rail 23. Still further, the rails 61 and locking assembly 120 may be configured so that the locking member 122 is lockingly received within a locking aperture in the rearward facing surface 68 of the rail. In still another embodiment, the rails 61 and the sidewalls 78 may not be separate components but rather a unitary member that slides within the guide members 27 and supports the horizontal lower step 81 and the horizontal upper step 95.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An access ladder assembly for a machine, comprising:
   a fixed section including a pair of spaced apart, parallel guide members and a horizontal fixed step;
   a movable section mounted on the fixed section, the movable section being movable along the fixed section and including a path between an extended position and a retracted position, the movable section including an engagement surface, a pair of spaced apart sidewalls, and at least one horizontal step extending therebetween;
   a biasing member configured to bias the movable section towards the retracted position;
   a locking member, the locking member being movable between a locked position and an unlocked position, wherein at the locked position, the locking member extends into the path of the movable section and engages the engagement surface of the movable section to prevent movement of the movable section from the extended position to the retracted position, and at the unlocked position, the locking member is spaced from the path of the movable section;
   a release assembly operatively associated with the locking member and including a manually engagable actuator disposed adjacent the horizontal fixed step of the fixed section, the manually engagable actuator being movable between a first position and a second position, wherein at the second position, the locking member is moved to the unlocked position.

2. The access ladder assembly of claim 1, wherein the manually engagable actuator is further disposed along one of the guide members.

3. The access ladder assembly of claim 1, wherein the manually engagable actuator is mounted on one of the guide members.

4. The access ladder assembly of claim 1, wherein the release assembly includes a release lever, the release lever being pivotably mounted and having a first end operatively connected to the manually engagable actuator and a second end operatively connected to the locking member.

5. The access ladder assembly of claim 4, wherein the manually engagable actuator is disposed above the horizontal fixed step.

6. The access ladder assembly of claim 1, wherein each guide member has a hollow portion and the movable section includes a pair of follower members, each follower member being configured to slidably move within the hollow portion of one of the guide members as the movable section moves between the extended position and the retracted position.

7. The access ladder assembly of claim 6, wherein the engagement surface comprises an upper surface of one of the follower members.

8. The access ladder assembly of claim 6, further comprising a second biasing member, one of the biasing members being disposed within the hollow portion of each guide member.

9. The access ladder assembly of claim 7, wherein each follower member includes a follower hollow portion, and one of the biasing members extending through the follower hollow portion.

10. The access ladder assembly of claim 1, wherein the horizontal fixed step is mounted to and extends between the guide members.

11. The access ladder assembly of claim 1, wherein the fixed section includes a mounting member, the mounting member being configured to mount the fixed section to the machine.

12. The access ladder assembly of claim 1, further comprising a lock biasing member configured to bias the locking member in the locked position.

13. An access ladder assembly for a machine, comprising:
   a fixed section including a pair of spaced apart parallel guide members, the guide members having a hollow portion and a horizontal fixed step;
   a movable section mounted on the fixed section, the movable section being movable along the fixed section and including a path between an extended position and a retracted position, the movable section including a pair of spaced apart sidewalls and at least one step extending therebetween, the movable section further including a pair of follower members, each of the follower members being configured to slidably move within the hollow portion of one of the guide members as the movable section moves between the extended position and the retracted position;
   a biasing member configured to bias the movable section towards the retracted position;
   a locking member, the locking member being movable between a locked position and an unlocked position, wherein at the locked position, the locking member is configured to prevent movement of the movable section from the extended position to the retracted position, and at the unlocked position, the movable section is movable from the retracted position to the extended position;

a release assembly operatively associated with the locking member, the release assembly being movable between a locked position and a released position, wherein upon moving the release assembly to the released position, the locking member is moved to the unlocked position.

14. The access ladder assembly of claim 13, further comprising a second biasing member, one of the biasing members being disposed within the hollow portion of each guide member.

15. The access ladder assembly of claim 13, further comprising a lock biasing member configured to bias the locking member in the locked position.

16. The access ladder assembly of claim 15, wherein each follower member includes a follower hollow portion, and one of the biasing members extending through the follower hollow portion.

17. The access ladder assembly of claim 13, wherein the fixed section includes a mounting member, the mounting member being configured to mount the fixed section to the machine.

18. The access ladder assembly of claim 13, wherein the release assembly includes a manually engagable actuator disposed adjacent the horizontal fixed step of the fixed section, the manually engagable actuator being movable between a first position and a second position, wherein at the second position, the locking member is moved to the unlocked position.

19. A machine comprising:
a frame;
a prime mover mounted on the frame;
a ground-engaging drive mechanism operatively connected to the prime mover;
an operator station;
an elevation control mechanism to adjust a height of the machine relative to a ground surface; and
an access ladder assembly for providing access to the operator station, the access ladder assembly comprising:

a fixed section including a pair of spaced apart, parallel guide members and a horizontal fixed step;
a movable section mounted on the fixed section, the movable section being movable along the fixed section and including a path between an extended position and a retracted position, the movable section including an engagement surface, a pair of spaced apart sidewalls, and at least one horizontal step extending therebetween;
a biasing member configured to bias the movable section towards the retracted position;
a locking member, the locking member being movable between a locked position and an unlocked position, wherein at the locked position, the locking member extends into the path of the movable section and engages the engagement surface of the movable section to prevent movement of the movable section from the extended position to the retracted position, and at the unlocked position, the locking member is spaced from the path of the movable section;
a release assembly operatively associated with the locking member and including a manually engagable actuator disposed adjacent the horizontal fixed step of the fixed section, the manually engagable actuator being movable between a first position and a second position, wherein at the second position, the locking member is moved to the unlocked position.

20. The machine of claim 19, where each guide member has a hollow portion, the movable section includes a pair of follower members, each follower member includes a follower hollow portion and each follower member is configured to slidably move within the hollow portion of one of the guide members as the movable section moves between the extended position and the retracted position, and further comprising a second biasing member, one of the biasing members being disposed within the hollow portion of each guide member and the follower hollow portion of one of the follower members.

* * * * *